United States Patent [19]
Penney

[11] 3,910,779
[45] Oct. 7, 1975

[54] ELECTROSTATIC DUST FILTER

[76] Inventor: Gaylord W. Penney, 216 Paris Road, Pittsburgh, Pa. 15235

[22] Filed: July 23, 1973

[21] Appl. No.: 381,781

[52] U.S. Cl. ............... 55/124; 55/131; 55/136; 55/150; 55/155; 53/341
[51] Int. Cl.² ............................................. B03C 3/01
[58] Field of Search ............ 55/124, 128, 129, 131, 55/132, 136, 150, 138, 154, 155, 55/341, 379, 378

[56] References Cited
UNITED STATES PATENTS

| | | | |
|---|---|---|---|
| 1,931,436 | 10/1933 | Deutsch | 55/152 X |
| 2,142,128 | 1/1939 | Hoss et al. | 55/131 |
| 2,152,077 | 3/1939 | Meston et al. | 317/242 X |
| 2,297,601 | 9/1942 | Williams | 55/151 X |
| 2,502,560 | 4/1950 | Dahlman | 55/132 |
| 2,735,509 | 2/1956 | Fields | 55/132 |
| 2,814,355 | 11/1957 | Powers | 55/132 |
| 2,844,216 | 7/1958 | Swanson | 55/302 X |
| 2,864,460 | 12/1958 | Powers | 55/132 |
| 2,888,092 | 5/1959 | Powers | 55/132 |
| 2,917,130 | 12/1959 | Powers | 55/132 |
| 3,026,964 | 3/1962 | Penney | 55/137 |
| 3,273,317 | 9/1966 | Vicard | 55/131 X |
| 3,365,858 | 1/1968 | Penney | 55/155 X |
| 3,385,033 | 5/1968 | Basore et al. | 55/341 X |
| 3,421,295 | 1/1969 | Swift et al. | 55/302 |
| 3,487,610 | 1/1970 | Brown et al. | 252/64 X |
| 3,577,705 | 5/1971 | Sharlit | 55/465 X |
| 3,733,784 | 5/1973 | Anderson | 55/379 X |

FOREIGN PATENTS OR APPLICATIONS

| | | | |
|---|---|---|---|
| 46,599 | 1/1971 | Japan | 55/131 |
| 8,104 | 7/1932 | Australia | 55/2 |
| 698,874 | 10/1953 | United Kingdom | 55/DIG. 38 |
| 625,842 | 8/1961 | Canada | 55/302 |
| 709,476 | 5/1954 | United Kingdom | 55/122 |
| 714,589 | 9/1954 | United Kingdom | 55/150 |
| 794,038 | 4/1958 | United Kingdom | 55/154 |
| 31,911 | 6/1884 | Germany | 55/120 |
| 557,681 | 2/1957 | Italy | 55/131 |

*Primary Examiner*—Bernard Nozick
*Attorney, Agent, or Firm*—Brown, Murray, Flick & Peckham

[57] ABSTRACT

An electrostatic dust filter is provided utilizing a fabric filtering member. The dust particles are electrically charged and are deposited on the filter member in an electric field maintained at the surface of the filter, so that the dust particles deposit in a relatively porous layer having a low pressure drop across the filter element as compared to conventional filters.

14 Claims, 8 Drawing Figures

ELECTROSTATIC DUST FILTER

BACKGROUND OF THE INVENTION

The present invention relates to electrostatic filters and, more particularly, to fabric filters for removing dust particles or other particulate matter from a stream of air or other gas.

Conventional fabric dust filters consisting essentially of a layer of cloth, or other textile fabric, are very efficient dust collecting devices. The effectiveness of these devices, however, is not primarily due to the fabric filtering element itself but results from the layer of dust which collects on the fabric. This layer of dust provides a very effective filtering action but it tends to build up into a substantially impervious layer which results in excessive pressure drop across the filter. This is highly undesirable because of the excessive amount of power required to force a given flow of gas through the filter, and necessitates frequent cleaning or replacement of the filter element.

SUMMARY OF THE INVENTION

In accordance with the present invention, an electrostatic fabric dust filter is provided in which a relatively porous layer of dust is built up which has a highly efficient filtering action but with a low pressure drop across the filter.

This result is achieved by electrically charging the dust particles and maintaining an electric field at the surface of the filter element itself so that the dust is deposited on the filter element in the electric field. This results in a relatively porous layer of dust accumulating on the filter because the slight surface irregularities tend to concentrate the electric field and the charged dust particles follow the field so that they tend to deposit on these irregularities. This further concentrates the field and causes the dust to deposit in closely spaced columns or pyramids so that the layer of dust remains relatively porous.

The invention may be applied to any desired type of filter structure. For example, the dust-laden air or gas stream may be passed through a charging section where it flows between grounded plates and corona wires charged to a high voltage so that the dust particles are electrically charged. The charged dust particles may then be carried to a filtering section where the gas passes through fabric filter elements on which the dust deposits. The filter elements are supported on grounded metal supports and metal plates are disposed parallel to the filter surfaces at a suitable distance therefrom and maintained at a high voltage to provide an electric field at the surface of the filter but with no corona. The charged particles are thus deposited on the filter in the electric field and form a porous layer so that the pressure drop across the filter is kept low even with a relatively thick layer and highly efficient filtering action is obtained.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1A:
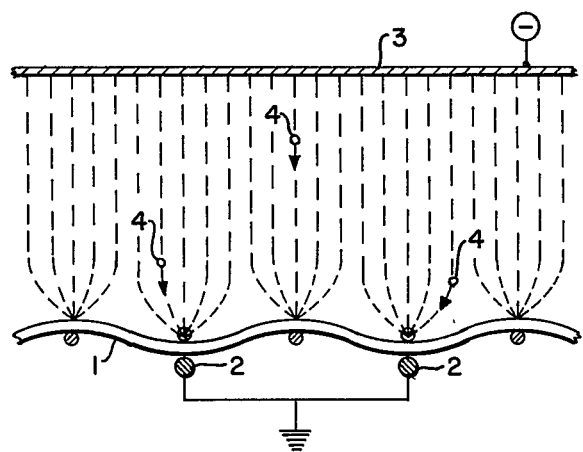
FIGS. 1A and 1B are diagrammatic views illustrating the principle of the invention.
Figure 1B:
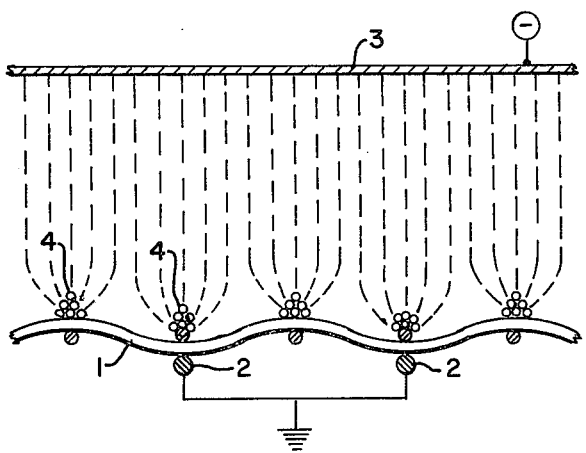

The principle of the present invention is illustrated diagrammatically in FIGS. 1A and 1B. Referring first to FIG. 1A, there is shown a section of a filter element 1 which may be a piece of woven cloth, or other textile fabric suitable for use as a filter, and which is shown greatly magnified for clarity of illustration. The filter element 1 is supported on a grounded metal support 2 which may be a screen, grid or other suitable support. A conducting plate 3 is disposed substantially parallel to the filter element 1 at a suitable distance and a high voltage, preferably negative, is applied to the plate 3 to provide an electric field at the surface of the filter 1 as indicated by the dotted lines which represent lines of force of the electric field. The field should be relatively high but with a voltage gradient such that no corona discharge can occur so that there is no substantial concentration of gas ions.

As shown in FIG. 1A, the electric field is substantially uniform between the plate 3 and the vicinity of the filter 1, but in the immediate neighborhood of the filter the field tends to concentrate in the locations of the small irregularities or projections present on the surface of the filter element, as indicated by the convergence of the field lines. This phenomenon will occur at any slight projection or surface irregularity that may be present on the filter element 1 even if a very smooth surface is presented. The dust particles are electrically charged with the same polarity as the plate 3, and thus tend to follow the lines of the electric field. Each particle is driven by a force proportional to its charge multiplied by the strength of the electric field, and the typical velocity of such particles in the direction of the field is of the order of 30 feet per minute relative to the air. The velocity of the air flowing through the filter would normally be from 1 to 10 feet per minute. Thus, the velocity of the charged dust particles relative to the air is higher than the velocity of the air itself, and the dust particles are driven toward the filter element 1 following the lines of force of the field.

Individual dust particles 4 are indicated in FIG. 1A and tend to move along the lines of force in the directions indicated by the arrows. The particles, therefore, deposit on the projections or irregularities of the filter surface rather than being driven into the cloth itself. Since the dust is more conductive than the air, these deposited dust particles tend to further concentrate the field so that successive particles deposit on top of earlier ones. The dust particles, therefore, build up as shown in FIG. 1B in closely spaced columns or pyramids at the irregularities or projections of the filter surface, the spacing being greatly exaggerated in the drawing for clarity. Thus, the layer of dust formed by deposit of the dust particles remains relatively porous even though a substantial thickness of dust may be built up, and very effective filtering with low pressure drop is obtained. In the absence of an electric field, the dust would tend to follow the air flow into any pores or thinner areas than might exist, thus plugging them and forming a relatively impervious layer with high resistance to gas or air flow. The presence of the electric field, however, causes the charged particles to deposit in the manner shown and results in a porous layer of dust. This also facilitates cleaning of the filter by reverse gas flow, or similar means, since the charged dust tends to fall off readily, leaving the cloth relatively clean, because of the fact that the dust has deposited on the surface irregularities and projections and has not been driven into the cloth.

An illustrative embodiment of the invention is shown in FIGS. 2–5 in a filter structure of the bag type. As shown particularly in FIG. 2, the complete filter assembly may be contained in a sheet metal housing generally designated 10. The filter is intended to remove dust or other particulate matter from a stream of air or other gas, and the dust-laden gas enters through an entry duct 12 at one side of the housing 10. The air is directed by the duct 12 through a charging section 14 where the dust particles are electrically charged, and then by a duct 16 to a filtering section 18 where the dust is removed from the gas.

The filtering section 18 includes a plurality of filtering means which are shown as extending downward from the lower surface of a duct 20 which extends across the top of the housing 10. Each of the filtering means consists of a filtering element or bag 22 which may be made of cloth or other suitable textile fabric, or of any suitable porous filter material. The filter elements 22 are supported on grounded metal supports 23 which may be metal grids, as shown, or screens or other suitable metallic supports which are sufficiently open to not materially obstruct the flow of gas, and which are effectively grounded by their connection to the sheet metal duct 20 and housing 10. As illustrated, the supports 23 are generally rectangular in cross section, and the filter elements 22 are stretched over the supports to form the walls of vertical passageways 24. The dust-laden gas flows upward from the duct 16, through the filter elements 22 into the passageways 24 and up to the duct 20, the bottom of each of the passageways 24 being closed by an impervious sheet metal member 25.

Figure 3:
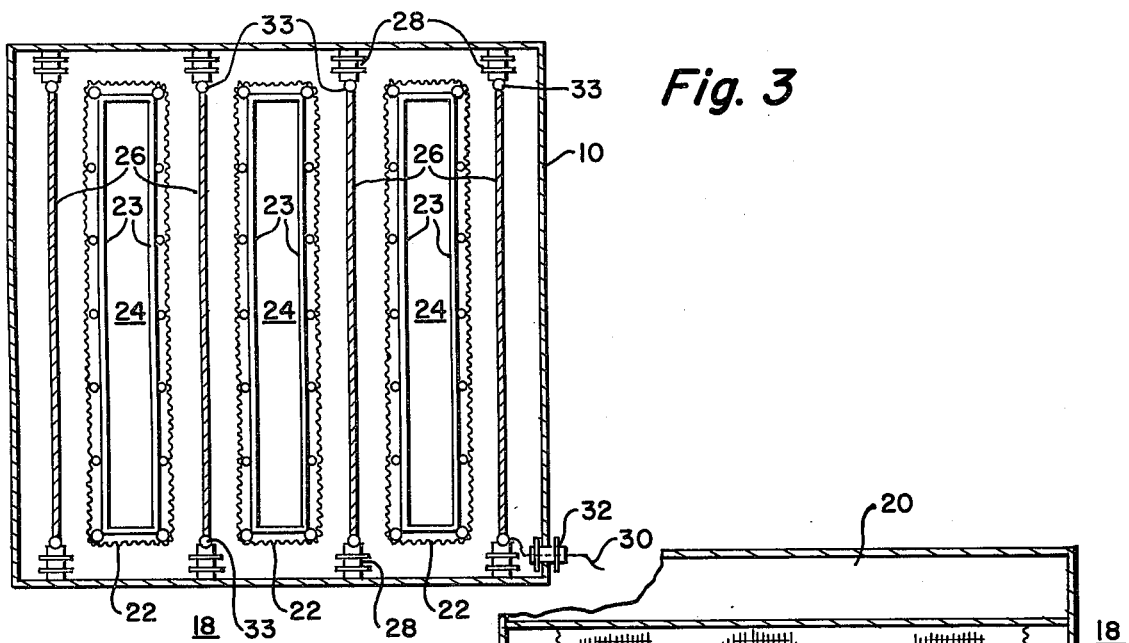
FIG. 3 is a horizontal sectional view substantially on the line III—III of FIG. 2.
Figure 4:
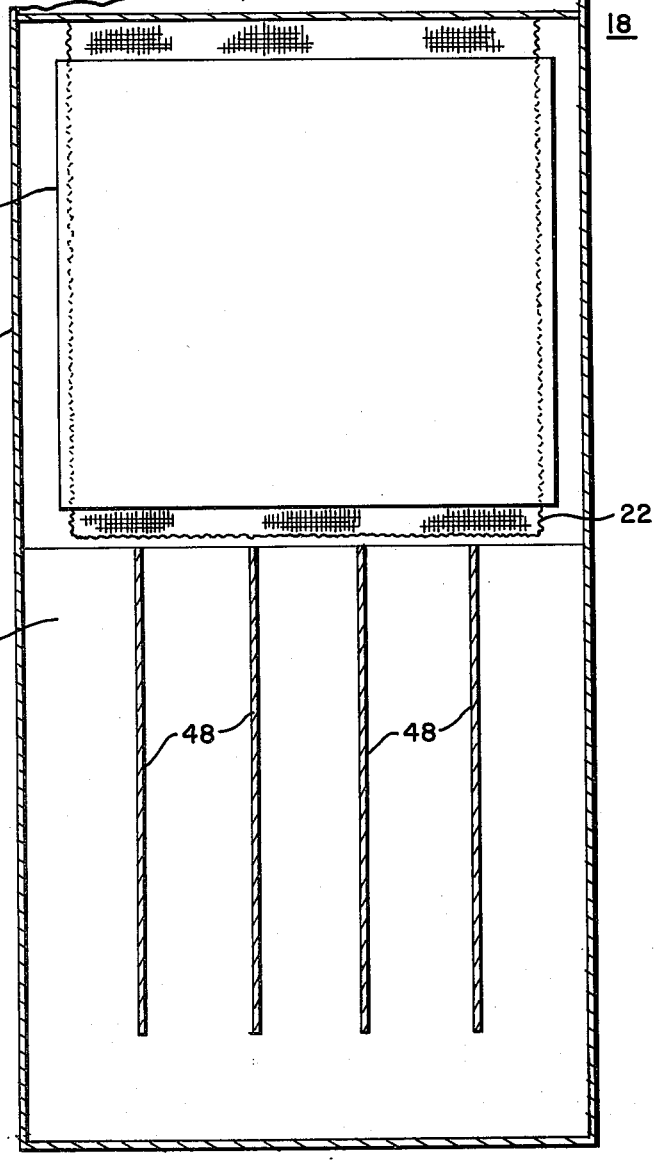
FIG. 4 is a transverse sectional view substantially on the line IV—IV of FIG. 2.

An electric field is maintained at the surface of each filter element 22 by means of metal plates 26 disposed to extend transversely of the housing 10 and substantially parallel to each of the filter surfaces 22. The plates are supported at each end on insulators 28, as shown in FIG. 3, and a high voltage is applied to the plates 26 through a conductor 30 which enters the housing through an insulating bushing 32, and which is connected to all the plates in any desired manner. The plates 26 have rounded edges as indicated at 33 to prevent the possibility of any corona discharges from sharp points or edges.

The voltage applied to the plates 26 should be high enough to provide the required electric field at the surfaces of the filter elements, and should be of the same polarity as the charge applied to the dust particles which is preferably negative. The strength or voltage gradient of the field, however, should be such that no corona can occur so that there will be no substantial concentration of gas ions which could give rise to a corona current. Such current would necessarily be conducted through the layer of dust and the fabric filter element. If the resistivity of the dust is low enough, this might be tolerated, but in most cases the resistivity could be sufficiently high to cause a voltage gradient in the dust exceeding the voltage gradient of the electric field itself. This effect would then cause the dust to deposit in any depressions in the dust layer, thus making a more dense deposit and defeating the purpose of the invention. For this reason, no corona should be permitted to occur. It is, of course, difficult to define or to measure exactly what constitutes objectionable corona, or to state at what point corona might be said to occur. For the purposes of the present invention, however, a corona current not exceeding $10^{-11}$ amperes per square centimeter can be tolerated and, if any corona current is less than this value, it can be considered as being essentially zero.

Figure 2:
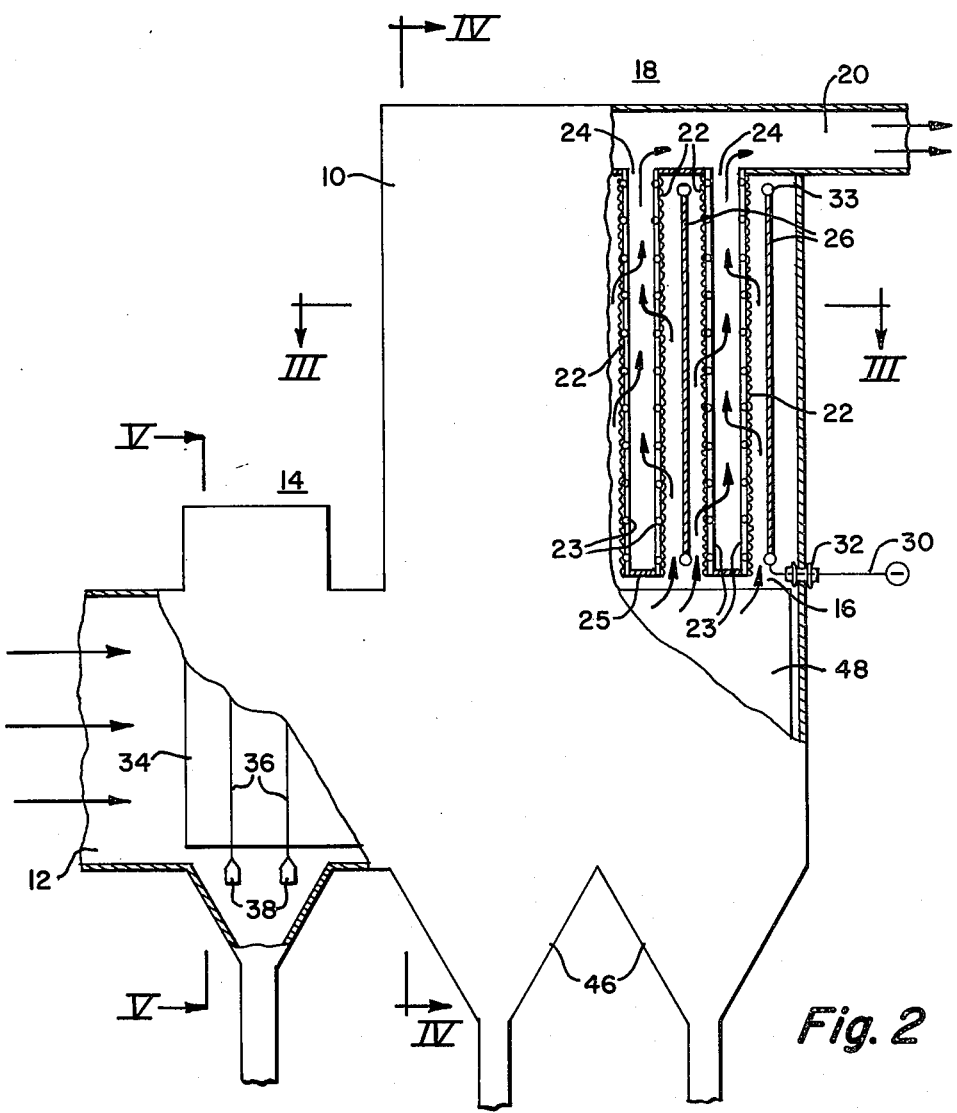
FIG. 2 is a view, partly in elevation and partly in longitudinal section, of a filter structure embodying the invention.
Figure 5:
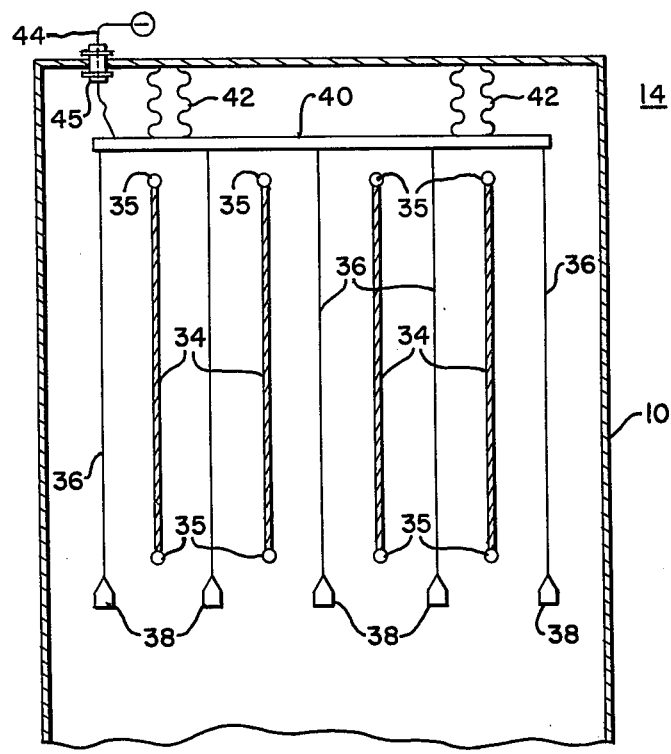
FIG. 5 is a transverse sectional view substantially on the line V—V of FIG. 2.

The dust particles may, of course, be electrically charged in any desired manner and the dust-laden gas then directed upward into the filter portion 18. In the illustrative embodiment shown in the drawings, the complete filter assembly includes a charging portion 14 as previously mentioned. The charging portion 14 is enclosed in the housing 10 and the entrance duct 12 conveys the gas to be cleaned directly into the charging portion. Within the charging portion 14 a plurality of grounded plates 34 extend longitudinally of the charging section, that is, parallel to the direction of gas flow, and are supported in any suitable manner on the sheet metal housing 10, which connects the plates to ground and itself serves as an additional grounded plate on each side of the assembly. The plates 34 have rounded edges of relatively large radius, as indicated at 35, to prevent corona discharges from these edges. A plurality of corona wires 36 is suspended between the plates 34 as shown in FIGS. 2 and 5. The wires 36 have weights 38 at their lower ends to hold them under tension and may be suspended from hangers 40 mounted on insulators 42 at the top of the housing 10. A high voltage conductor 44 is brought in through an insulating bushing 45 and connected to the hangers 40 to charge the wires 36 to a high potential which is preferably negative or of the same polarity as the voltage applied to the plates 26 in the filtering section 18.

The wires 36 are maintained at a high potential such that the corona between these wires and the grounded plates 34 electrically charges the dust particles carried through the passageways between the plates by the entering gas. The plates 34 divide the duct through the charging section into relatively narrow passages, which prevents excessive potentials from developing in the duct. This charging arrangement is satisfactory for dust particles having resistivities of usual magnitudes, but if the dust has unusually high resistivity, such as greater than about $10^{11}$ ohm-centimeter, special provisions for charging may be necessary because of the fact that the corona current in the charging section must be conducted through the dust layer. In such cases, other known expedients may be utilized to sufficiently charge the dust. For example, the grounded electrodes may be cooled to promote absorption of moisture on the surface of the dust particles, as disclosed in my prior Patent 3,026,964, or if desired, the corona current might be pulsed or the spacing between the charging wires and grounded plates may be adjusted to reduce the current density of the corona current in the dust layer.

The charged dust particles are carried from the charging section 14 by the stream of gas which is directed by the duct 16 upward into the filter section 18. The duct 16 is part of the sheet metal enclosure 10 and its lower surface may be formed to provide a plurality of hoppers 46 for receiving dust removed from the gas. The dust-laden gas entering the charging section 14 and duct 16 will usually contain a high concentration of dust and, since the dust particles are given a substantial charge in passing through the charging section, a relatively high potential may be built up in a relatively small volume. For this reason, the charging section 14 and duct 16 are subdivided into passageways of widths such that the space charge potential due to the charge on the dust particles is limited to a safe value. This may be done by extending the grounded plates 34 of the charging section throughout the entire length of the duct 16, so that it is subdivided into passageways of the same width as the spacing between the plates in the charging section. If desired, however, separate grounded plates 48 may be utilized in the duct 16 to subdivide it into passageways. For lower dust densities somewhat greater spacing between the plates may be permitted than that indicated but, in any event, it should not be more than four times the spacing between the wires 36 and ground in the charging section, except for very light dust loadings.

In operation, the dust-laden gas enters through the entry duct 12, as shown by the arrows in FIG. 2, and passes through the charging section 14 where the dust particles are given a negative charge as previously explained. The gas stream carrying the charged particles then passes through the duct 16 into the filtering section 18 where it passes upward, through the filter elements 22 into the passageways 24 as previously described, and to the exit duct 20, the path of the gas being substantially as indicated by the arrows. The dust carried by the gas stream is deposited on the filter elements 22 in the electric field provided by the plates 26 in the manner previously described. The dust thus accumulates in relatively porous layers on the filters 22 and a very effective filtering action is obtained but the pressure drop across each layer of dust remains relatively low and a desired flow of gas can be maintained without requiring excessive power. When cleaning is necessary or desired, the dust may be removed from the filters 22 by mechanically shaking or tapping them, or by pulses of reverse gas flow. In either case, the dust readily falls from the filter, as it has been deposited only on the surface projections or irregularities, and falls freely into the hoppers 46 from which it may be removed in any desired manner.

It will be understood that the dust particles may be charged in any desired manner, and in some cases, the charging section may not be needed. Thus, dusts resulting from mechanical abrasion, and dusts blown from surfaces, are often electrically charged. In these cases both positively and negatively charged particles may be intermingled, so that the resulting space charge potential is relatively low, and the dust-laden gas may be taken directly into the filtering section. In this case, if the electrode plates 26 are negative, the negatively charged particles are deposited on the fabric filters 22 as previously described. Positively charged particles collect on the plates 26 from which they will eventually fall off or the plates may be tapped periodically to shake the dust off.

Figure 6:
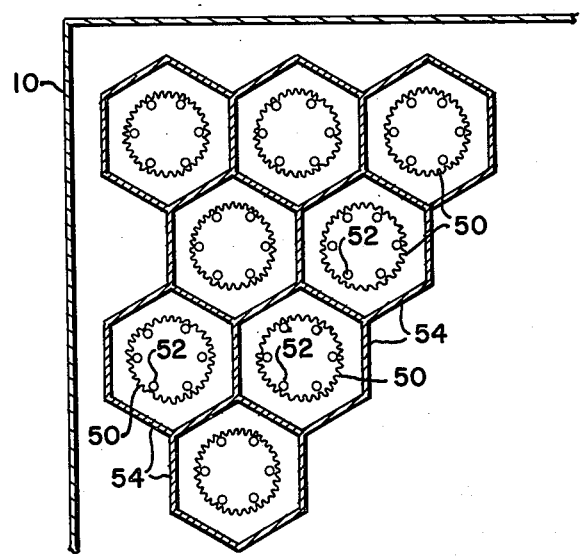
FIG. 6 is a partial horizontal sectional view similar to FIG. 3 showing another embodiment of the invention.
Figure 7:
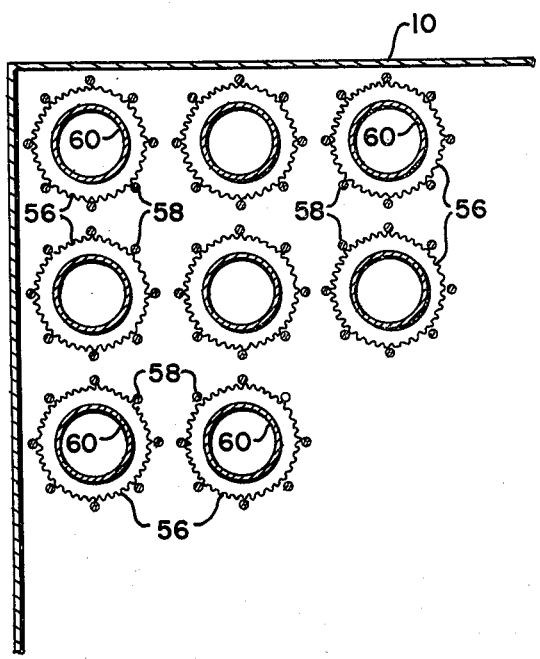
FIG. 7 is a view similar to FIG. 6 showing a further modification.

It will also be understood that various modifications and changes may be made in the mechanical arrangement and configuration of the filter section, and that any desired type of support may be used for the filter cloth. FIGS. 6 and 7, for example, show modified arrangements of the filter construction in which the filter elements are of circular cross section rather than rectangular as in FIG. 3. In FIG. 6, fabric filter elements 50 are shown supported on cylindrical metal supporting structures 52 over which the cloth filters are stretched. The high voltage plates 54 which establish the electric field are made in the form of tubular members of hexagonal cross section, each of the tubular electrodes 54 surrounding one of the filter elements 50 and the hexagonal shape permitting nesting as shown. The hexagonal configuration results in plate surfaces that approach parallelism with the circular filter elements 50 closely enough so that the electric field at the surface of the filter is sufficiently uniform to obtain the desired results. In this embodiment, the dust-laden gas flows radially inward through the cloth filters into the interior of the circular filter elements and then up to the exit duct. In FIG. 7, the direction of gas flow through the filter is reversed. The cloth filters 56 in FIG. 7 are supported on the inside of cylindrical grounded supports 58 and the high voltage plates 60 are tubular members of circular cross section and are disposed inside the filter elements. In this arrangement, the dust-laden air flows up inside the tubular filters 56 and passes radially outward through the filters and upward to the discharge duct. In both FIG. 6 and FIG. 7, the grounded supports 52 and 58 may be metal screen or grid structures of cylindrical configuration and are attached to the bottom of the exit duct 20 in the same manner as the rectangular supports 23 of FIGS. 2 and 3.

In the embodiments of the invention so far described, the electric field at the surface of the filter element is provided by high voltage plates or electrodes adjacent the filter surface. In some cases, however, these electrodes may not be necessary. With a moderately high density of dust, the charge acquired by the dust particles in the charging section is limited by the space charge on the particles themselves. In this situation, the dust leaving the charging section has a given charge per unit volume and the space charge due to the charges on the dust particles can provide the necessary field at the surface of the filter. For this purpose, the spacing between adjacent filter surfaces must be such that there is the proper amount of charged dust to produce the required field at the filter surface. For moderately high dust loading, where the charge on the dust particles is limited by space charge, the spacing between parallel filter surfaces is best determined by experiment, since it is affected by the surface conditions of the filters, but typically will be between two and six times the distance between the corona wires and the adjacent grounded surfaces in the charging section. For cylindrical filter surfaces, as in FIGS. 6 and 7, the radius of the cylinder should be in the same range. For lower dust densities such that the charge acquired in the charging section is not space charge limited, the required field can still be provided by the charged dust, provided that the dust loading is relatively constant, by increasing the spacing between filter surfaces to produce the required field. In these situations, therefore, where the required electric field can be produced by the charged dust itself, the high voltage plates or electrodes in the filter section can be omitted, with a substantial reduction in the cost of the filter assembly.

It will now be apparent that an electrostatic dust filter has been provided which utilizes cloth or fabric filters to remove dust particles from gas or air streams, but in which the build up of substantially impervious dust layers which has previously occurred in such filters is prevented by depositing charged dust particles in an electric field at the surface of the filter. Certain specific embodiments of the invention have been shown and described for the purpose of illustration but it will be understood that the invention is not limited to these particular embodiments. Thus, for example, although cloth filters have been described, any other suitable filter material could be used, and any suitable physical arrangement may be employed.

I claim as my invention:

1. An electrostatic filter for collecting electrically charged particles in a porous layer, said filter comprising a porous filter member having a surface extending across the path of movement of said particles, said filter member including a grounded metal support and a fabric filtering element disposed directly on said support, means for maintaining a substantially constant, unidirectional electric field at said surface in a direction generally perpendicular to the surface and of polarity to drive said particles toward the surface, and means for maintaining the strength of the electric field such that no corona can occur.

2. An electrostatic filter as defined in claim 1 and including a grounded metal support for said filter member, said means for maintaining an electric field comprising at least one metal plate extending substantially parallel to the surface of the filter member, and means for applying a high voltage to said plate.

3. An electrostatic filter for collecting electrically charged particles in a porous layer, said filter including at least one filtering means, said filtering means having a grounded electrically conducting support means and a filter element disposed on said support means, said filter element comprising a fabric capable of filtering and collecting said particles, duct means for directing a stream of gas carrying electrically charged particles to flow through said filtering means, means for maintaining a substantially constant, unidirectional electric field adjacent the surface of said filter element in a direction to drive said particles toward the filter element and means for maintaining the electric field of a strength such that no corona can occur.

4. An electrostatic filter as defined in claim 3 having means below said filtering means for receiving particles removed from the gas, and means separated from said particlereceiving means for discharging clean gas after passage through the filtering means.

5. An electrostatic filter as defined in claim 3 in which said stream of particle-carrying gas is directed upwardly through said filtering means, and means above the filtering means for discharging clean gas after passage through the filtering means.

6. An electrostatic filter as defined in claim 3 in which said filtering means includes a grounded metal support for said filter element, a metal plate extending substantially parallel to the surface of the filter element, and means for applying a high voltage to said plate.

7. An electrostatic filter as defined in claim 3 which includes a plurality of filtering means, each of the filtering means comprising a grounded metal support and a fabric filter element disposed to form the walls of a passageway, means for directing said gas to flow through said walls and passageways, metal plate means disposed substantially parallel to the surfaces of the filter elements, and means for applying a high voltage to each of said plate members.

8. An electrostatic filter as defined in claim 7 in which said passageways are generally rectangular in cross section, and said plate members are flat plates extending substantially parallel to the sides of the rectangles.

9. An electrostatic filter as defined in claim 7 in which said passageways are circular in cross section, and each of said plates is of tubular configuration disposed coaxially with one of the passageways.

10. An electrostatic filter as defined in claim 3 in which said duct means for directing gas includes means for electrically charging particles carried by the gas.

11. An electrostatic filter as defined in claim 10 in which said charging means includes a plurality of grounded plates extending in the direction of movement of said gas stream, a plurality of wires disposed between said plates and parallel thereto, and means for applying a high voltage to said wires to electrically charge the particles passing through the charging means.

12. An electrostatic filter as defined in claim 11 in which said duct means for directing gas from the charging means to the filtering means is generally in alignment with the charging means, and said grounded metal plates extend through said duct means.

13. An electrostatic filter as defined in claim 10 including a plurality of substantially parallel, grounded electrically conductive plates in said charging means, said plates extending in the direction of gas flow and subdividing said duct into channels to prevent an excessive space charge effect.

14. An electrostatic filter as defined in claim 13 including a plurality of wires in said charging means disposed in the channels between said plates and parallel thereto, and means for applying a high voltage to said wires, the channels being of width not more than four times the spacing between the wires and said plates.

* * * * *